United States Patent [19]
Browning et al.

[11] Patent Number: 5,459,480
[45] Date of Patent: Oct. 17, 1995

[54] ARCHITECTURE FOR ISOLATING DISPLAY GRID SECTIONS IN A FIELD EMISSION DISPLAY

[75] Inventors: Jim J. Browning; John K. Lee, both of Boise, Id.

[73] Assignee: Micron Display Technology, Inc., Boise, Id.

[21] Appl. No.: 307,090

[22] Filed: Sep. 16, 1994

Related U.S. Application Data

[63] Continuation of Ser. No. 89,212, Jul. 8, 1993, abandoned, which is a continuation-in-part of Ser. No. 11,927, Feb. 1, 1993, Pat. No. 5,357,172, which is a continuation-in-part of Ser. No. 864,702, Apr. 7, 1992, Pat. No. 5,210,472.

[51] Int. Cl.$^6$ .................................................... G09G 3/10
[52] U.S. Cl. ........................................ 345/75; 315/349
[58] Field of Search ...................... 345/74, 75; 313/309, 313/336, 351, 495; 315/349, 169.1

[56] References Cited

U.S. PATENT DOCUMENTS

| | | | |
|---|---|---|---|
| 4,780,684 | 10/1988 | Kosmahl | 313/309 X |
| 4,874,981 | 10/1989 | Spindt | 313/309 |
| 4,908,539 | 3/1990 | Meyer | 315/169.1 X |
| 4,983,878 | 1/1991 | Lee et al. | 313/309 X |
| 5,194,780 | 3/1993 | Meyer | 313/309 X |
| 5,210,472 | 5/1993 | Casper et al. | 315/349 |

*Primary Examiner*—Ulysses Weldon
*Attorney, Agent, or Firm*—William R. Bachand

[57] ABSTRACT

The present invention teaches a field emission display ("FED") architecture for isolating display grids, wherein an FED has a plurality of pixels. Each of the pixels comprise at least two field emitter tips for displaying information to the pixel and a pixelator for driving the field emitter tips. Further, an isolated display grid is incorporated for each of the field emitter tips. Each display grid is coupled by a link to a bus having a predetermined voltage. In one embodiment of the present invention, the link can be disintegrated by internal or external means. In a second embodiment, the FED comprises a first and second bus, each bus having a predetermined voltage, whereby a first isolated display grid is coupled to the first bus by a first link and a second isolated display grids is coupled to the second bus by a second link.

13 Claims, 3 Drawing Sheets

ARCHITECTURE FOR ISOLATING DISPLAY GRID SECTIONS IN A FIELD EMISSION DISPLAY

CROSS REFERENCE TO RELATED APPLICATIONS

This application is a continuation of Ser. No. 08/089,212 filed Jul. 8, 1993, now abandoned, which is a continuation in part of U.S. application Ser. No. 08/011,927, filed Feb. 1, 1993, now U. S. Pat. No. 5,357,172, which is a continuation in part of U.S. application Ser. No. 07/864,702, filed Apr. 7, 1992 now issued as U.S. Pat. No. 5,210,472.

FIELD OF THE INVENTION

The present invention relates to Field Emission Displays (FEDs), and more particularly, an architecture for isolating display grids in an FED.

BACKGROUND OF THE INVENTION

Until recently, the cathode ray tube ("CRT") has been the primary device for displaying information. While having sufficient display characteristics with respect to color, brightness, contrast, and resolution, CRTs are relatively bulky and power hungry. In view of the advent of portable laptop computers, the demand has intensified for a display technology which is lightweight, compact, and power efficient.

One available technology provides flat panel displays, and more particularly, Liquid Crystal Display ("LCD") devices. LCDs are currently used for laptop computers. However, these LCD devices provide poor contrast in comparison to CRT technology. Further, LCDs offer only a limited angular display range. Moreover, color LCD devices consume power at rates incompatible with extended battery operation. In addition, a color LCD tends to be far more costly than an equivalent CRT.

In light of these shortcomings, there have been several developments recently in thin film, Field Emission Display ("FED") technology. In U.S. Pat. No. 5,210,472, commonly assigned with the present invention and incorporated herein by reference, a FED design is disclosed which utilizes a phosphor luminescent screen and a matrix-addressable array of pointed, thin-film, cold emission cathodes each powered by a current regulator. Here, the FED incorporates a column signal to activate a column switching driver and a row signal to activate a row switching driver. At the intersection of both an activated column and an activated row, a grid-to-emitter voltage differential exists sufficient to induce a field emission, thereby causing illumination of the associated phosphor in a pixel on the phosphorescent screen. By employing this design, the bus line associated with the current regulator has a low parasitic capacitance, thus being easier to control.

Extensive research has recently made the manufacture of an inexpensive, low power, high resolution, high contrast, full color FED a more feasible alternative to LCDs. However, in order to produce a high resolution FED, a greater number of pixels per unit area (measured, for example, in square inches) is required. Thus, resolution is inversely proportional to the number of field emitter tips per pixel. For example, while a lower resolution FED may comprise 1000 tips per pixel, a higher resolution FED will comprise 1, 2, 3 or 4 tips per pixel.

Several problems may arise where a number of field emitter tips relate to a single pixel. Referring to FIG. 1, an FED is illustrated having a four tip per pixel design. In this architecture, four emitter tips, 20, 20', 20" and 20''', are each coupled together at a common node 25. Emitter tips 20, 20', 20" and 20''' are additionally coupled through a grid 15 to form a pixel 10 on an FED 5. Further, a pixelator 30 is coupled between a drive resistor 35 and common node 25.

The problems associated with this architecture are best understood from a top view of a physical layout. Referring to FIG. 2, pixel 10 is illustrated comprising field emitter tips 20, 20', 20" and 20'''. Further, each tip, 20, 20', 20" and 20''' is positioned within the grid 15, which is coupled to a power bus 45 by means of a via or link 40. Because tips 20, 20', 20" and 20''' are each coupled to common node 25, should one tip electrically short, the remaining tips and the pixel as a whole will be inoperative as well. As there is no present design enabling the removal of a malfunctioning pixel, the entire FED, depending on the specifications, may be unusable. As such, the yield of an FED utilizing pixels of this design may be substantially adversely affected.

In light of these limitations, presently there is a need for an FED architecture which provides a means for decoupling a nonfunctional field emitter tip or tips. Ideally, this structural design must not increase manufacturing and labor costs. Thus, a circuit design solution incorporated into current FED technology is preferred.

SUMMARY OF THE INVENTION

To achieve the hereinabove advantage, as well as other advantages which will become apparent hereafter, an architecture for isolating display grids in a field emission display having a plurality of pixels is disclosed. Each of the pixels comprise at least two field emitter tips for displaying information in the pixel and a pixelator for driving the field emitter tips. Further, an isolated display grid is incorporated for each of the field emitter tips or for a group of tips. Each display grid is coupled by a link to a bus having a predetermined voltage.

In one embodiment of the present invention, the link comprises a fusible region which disintegrates when a predetermined current is being driven by the pixelator to the tip. Nonetheless, an external means can also be employed to disintegrate the link.

In a second embodiment, the FED comprises a first and second bus, each bus having a predetermined voltage, whereby a first isolated display grid is coupled to the first bus by a first link and a second isolated display grids is coupled to the second bus by a second link.

Other aspects and advantages will become apparent to those skilled in the art from the following detailed description read in conjunction with the appended claims and the drawings attached hereto.

BRIEF DESCRIPTION OF THE DRAWINGS

The present invention will be better understood from reading the following description of non-limitative embodiments, with reference to the attached drawings, wherein below.

It should be emphasized that the drawings of the instant application are not to scale but are merely schematic representations and are not intended to portray the specific parameters or the structural details of the invention, which can be determined by one of skill in the art by examination of the information herein.

DETAILED DESCRIPTION OF THE INVENTION

Figure 3:
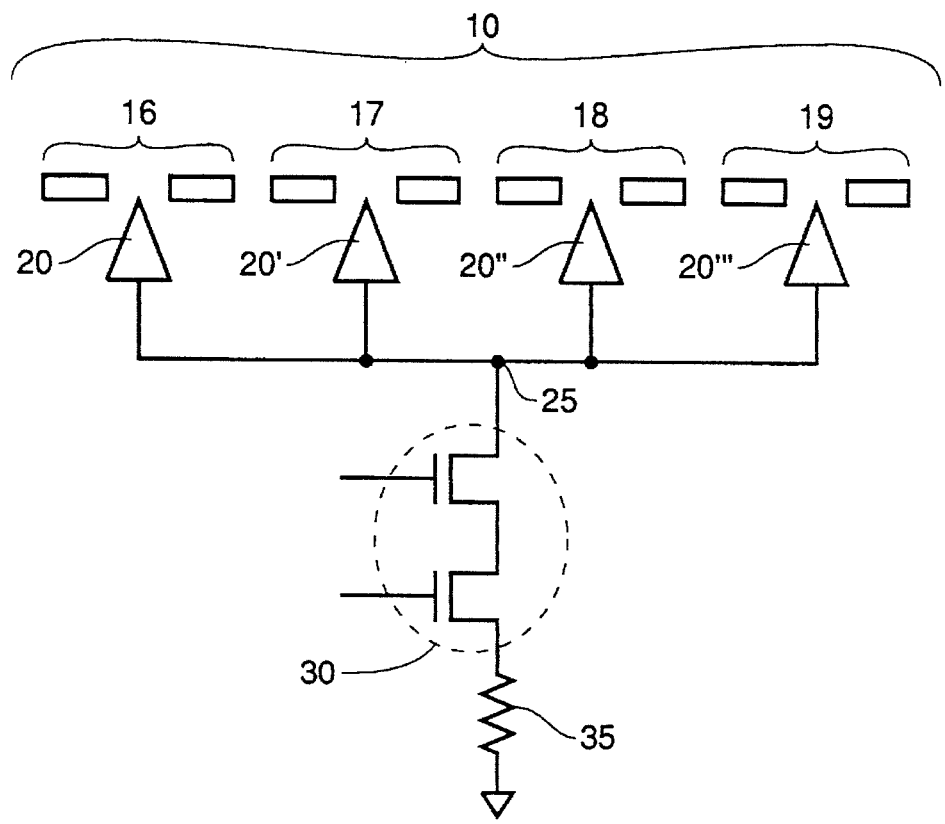
FIG. 3 is a schematic representation of the present invention.

Referring to FIG. 3, a schematic representation of the present invention is illustrated. A high resolution FED 85 is shown having a four tip per pixel design. It should be obvious to one of ordinary skill in the art that the present invention is applicable to any design having multiple tips per pixel, and not simply the four tips per pixel arrangement described herein.

Figure 1:
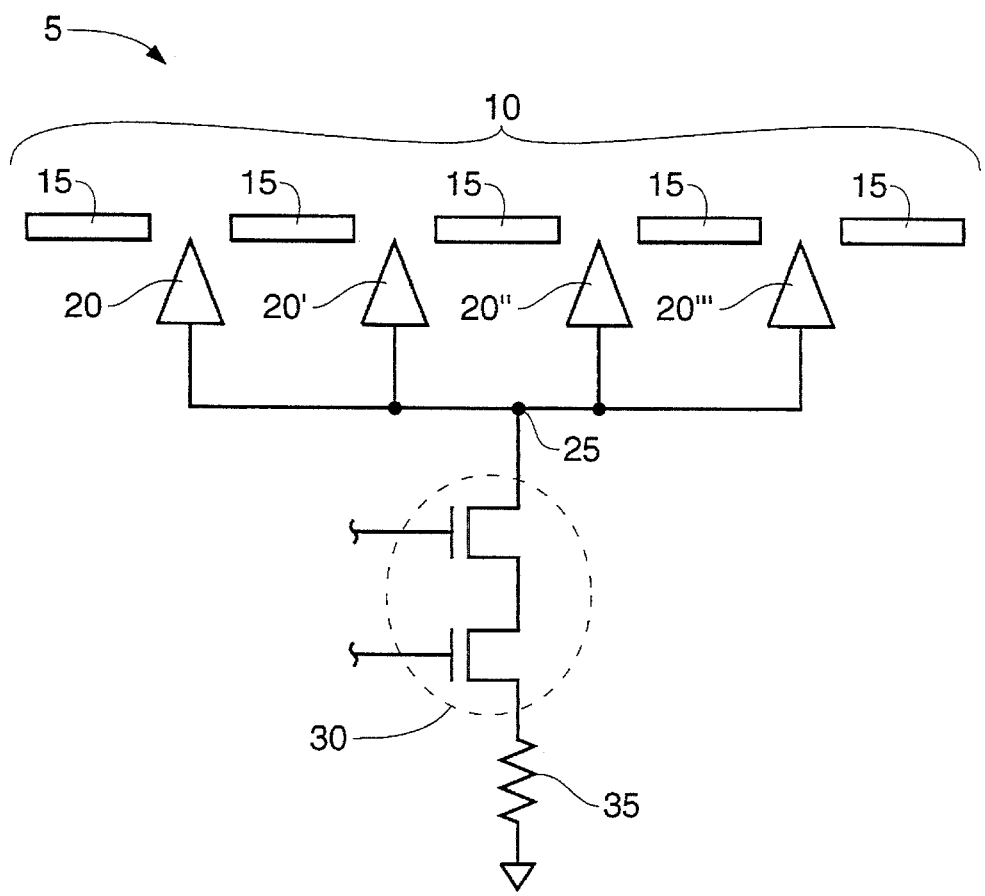
FIG. 1 is a schematic representation of a known field emission display architecture.
Figure 2:
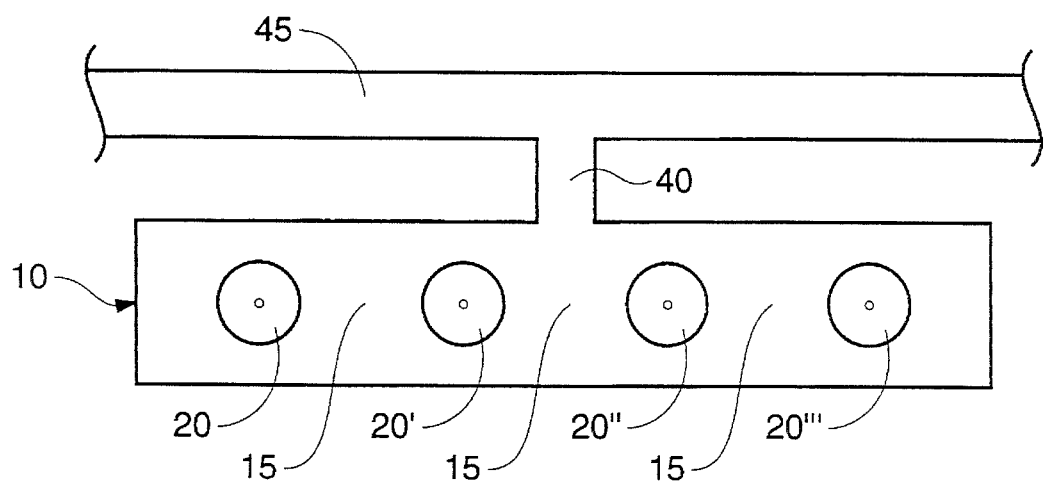
FIG. 2 is a top view of a physical layout of the known field emission display architecture shown in FIG. 1.

In high resolution FED 85, four emitter tips, 20, 20', 20" and 20''', are coupled together at a common node 25. To properly drive each tip, 20, 20', 20" and 20''', a pixelator 30 is coupled between a drive resistor 35 and common node 25. However, in each pixel 100, unlike known high resolution FED 5, shown in FIG. 1, each of the emitter tips, 20, 20', 20" and 20''', is coupled through an integral isolated grid, 16, 17, 18 and 19.

Figure 4:
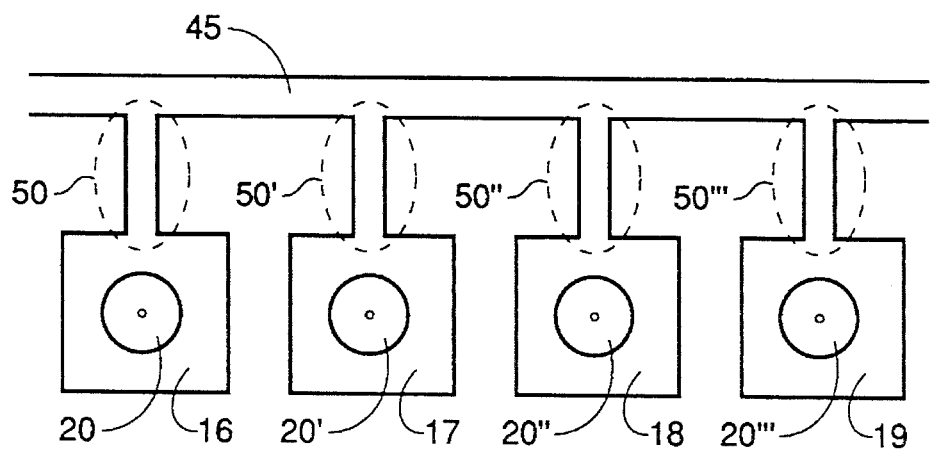
FIG. 4 is a top view of a physical layout of the present invention.

Referring to FIG. 4, a top view of a physical layout of the present invention is depicted. As described above, a one to one relationship exists between the number of emitter tips and the number of grid sections. By this design, each grid section 16, 17, 18 and 19, is coupled, by means of a via or link, 50, 50', 50" and 50''', to a bus 45 having a predetermined voltage for the purposes of properly biasing each grid section.

Having described the structural configuration of FIGS. 3 and 4, the advantages of the present invention should become more evident. In the event one or more of emitter tips 20, 20', 20", or 20''' should malfunction, the present invention enables the remaining functioning emitter tips to properly operate. Thus, should emitter tip 20 fail, the present invention provides means for decoupling the failed tip's associated grid section 50 from bus 45. Of particular significance, failed tip 20 can ultimately cause the remaining tips to fail when emitter tip 20 fails because of a short. By removing (for example decoupling) the failed tip from the pixel circuit, there remaining operating tips provide sufficient current to enable the pixel to properly function. Thus, it should be noted that while lowering the resolution of pixel 100, this decoupling step enables the pixel to properly operate furthermore, by the disintergration of the link of a failed tip, the need to remove a pixel from the display itself does not arise.

Prior to disintegrating the link associated with a failed tip, each pixel must be properly tested to ascertain which tips of that pixel are properly functioning. Several means for evaluating the operability of each of the field emitter tips are available to properly test each pixel. In one embodiment of the present invention, the operability of each tip is made apparent by stressing the entire display or specific pixels. Tips which are inoperative after being stressed emit infrared light after as a result of shorting. Thus, by means of an infrared sensor, such as an emission microscope for multilevel inspection ("EMMI"), a failing emitter tip that has shorted can be detected. Utilizing an EMMI, the coordinates of an inoperative tip can be ascertained and stored to enable the subsequent disintegration of its associated link.

Further, upon stressing a pixel., a second phenomenon has been observed. The isolated grid section of a properly functioning tip conducts a negligible current to its associated bus. However, the isolated grid section of a failed tip conducts a current substantially within the range of 100 nA and 10 µA. Given this event, in a second embodiment of the present invention, a failing emitter tip that has shorted can be detected by means of a current sensor, whereby the coordinates of an inoperative tip can be ascertained and stored to enable the subsequent disintegration of its associated link.

The disintegration of the link associated with a failed tip can be achieved using any of several methods. In one embodiment of the present invention, a system for decoupling each of the inoperable field emitter tips is disclosed. Being directly accessible to light emissions, the link associated with a failed tip can be disintegrated by exposing it to light emissions. These emissions should be generated by a laser, though other energy forms are also employable. The power necessary from a laser to sufficiently disintegrate the link through this approach is substantially in the range of 0.1 µWatt and 10 mWatt. However, there is a direct relationship between power and the dimensions of the links themselves. While a thicker link requires greater power, a thinner will require less power.

In an alternate embodiment of the present invention, the link associated with a failed tip can be dissolved by applying an acid etch solution. The acid solution employed should comprise $H_2SO_4$, $H_2SO_4$ and $H_2O_2$, or $H_3PO_4$, though other acids can also be used. However, when using an acid solution, consideration must be given to the potential damage to the remainder of the field emission display. As such, only a limited amount of acid solution can be used. A special applicator may be required to allow for the application of the acid.

Figure 5:
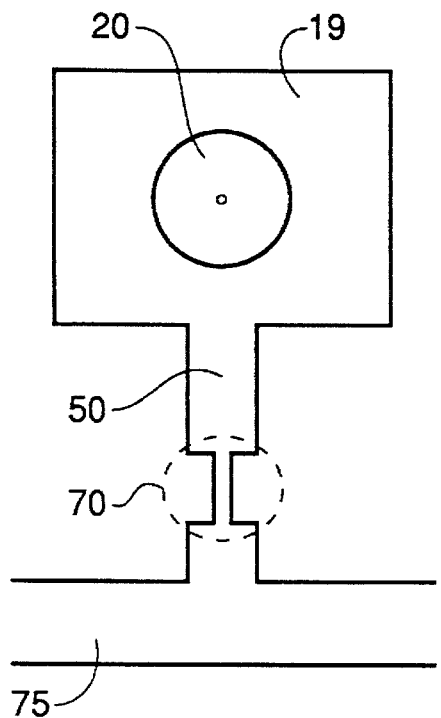
FIG. 5 is a top view of an alternate physical layout of the present invention.

In the preferred embodiment of the present invention, the link is disintegrated according to fuse technology. Referring to FIG. 5, a link 50 is shown coupling grid section 19 to a power bus 75. Link 50 comprises a fusible region 70 having predetermined dimensions. Fusible region 70 is incorporated on link 50 for the purpose of disintegrating the coupling between grid section 19 and bus 75 when a predetermined level of current begins to pass. For example, the dimensions of region 70 can be designed so that region 70 disintegrates when a short has formed to grid section.

Figure 6:
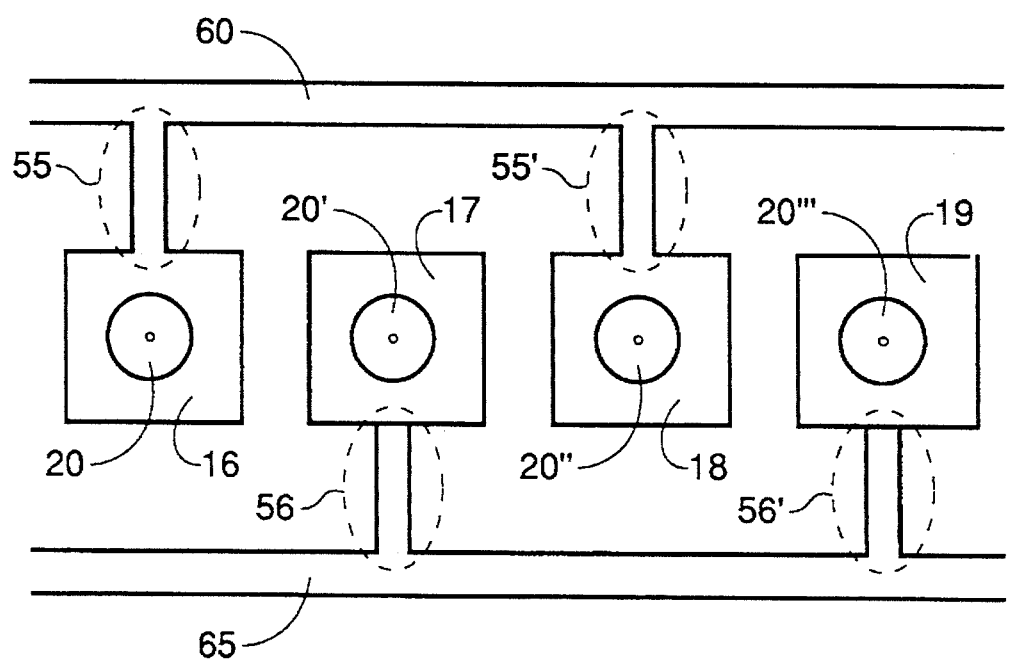
FIG. 6 is another top view of an alternate physical layout of the present invention.

Referring to FIG. 6, the present invention is illustrated with a top view of an alternate physical layout. As described above with reference to FIGS. 3 and 4, a one to one relationship exists between the number of emitter tips and the number of grid section. It should, however, be obvious to one of ordinary skill in the art that an architecture could be designed wherein a one to one relationship exists between the number of grid section and the number of power buses. Thus, it is conceivable, that in a four tip pixel arrangement, each of the four grid section has its own power bus. Other relationships, such as varying the number of tips per isolated display grid, are similarly devisable.

In the embodiments shown in FIG. 6, grid sections 16, 17, 18 and 19, are coupled into pairs, wherein grid section 16 and 18 form a first pair, and grid sections 17 and 19 form a second pair. Each pair is then independently coupled to one of two power buses, 60 and 65, by means of a via or link, 55, 55', 56 and 56'. Each power bus, 60 or 65, has a predetermined voltage for the purposes of properly biasing each grid section. A failed tip is removed from the pixel in the ways described with reference to FIGS. 4 and 5.

The structural configuration of FIG. 6 has several additional advantages. First, by subdividing each pixel into two pairs of grid sections, identifying a malfunctioning tip within a pixel is simplified. By biasing only one power bus, a shorted tip can be detected. This is achieved by subsequently measuring the current flow through the bus and the shorted pixel. As the other power bus is disabled, this approach enables the determination of which pair of tips is shorted. While this technique can be used for more than two tips per pixel resolution, to directly identify a particular shorted tip, a one to one relationship is required between the number of isolated display grids and the number of buses.

Similarly, a method for decoupling inoperative field emitter tips can be formulated. Initially, a field emission display is provided having a plurality of pixels. Each of the pixels of the display comprises at least two field emitter tips for displaying information to the pixel, a pixelator for driving the field emitter tips, a bus having a predetermined voltage, and a grid section for each of the field emitter tips. Each grid sections is coupled to the bus by a link.

Second, the step of testing each of the tips for operability is performed. This testing step involves the generation of a signal for identifying which of the field emitter tips is inoperable. This step of testing can be achieved in one embodiment by sensing infrared energy emitted from each inoperative field emitter tip. Thus, by using an emission microscope for multilevel inspection ("EMMI"), those tips which are inoperable can be identified. In an alternate embodiment, the testing step can be achieved by sensing a current between the inoperative tip and a grid section.

Third, the step of decoupling each of the inoperable tips is performed. This is achieved by disintegrating the link between the bus and the associated grid section of the failed tip signal. In one embodiment, disintegrating the link is accomplished by exposing the link to external energy substantially in the range of 0.1 μWatt and 10 mWatt. This energy is generated by a laser. In a second embodiment, disintegration is achieved by exposing the link to an acid etch solution. The acid etch solution preferably includes $H_2SO_4$, $H_2SO_4$ diluted with $H_2O_2$, or $H_3PO_4$. Other acids may also be suitable.

While the particular invention has been described with reference to illustrative embodiments, this description is not meant to be construed in a limiting sense. It is understood that although the present invention has been described in a preferred embodiment, various modifications of the illustrative embodiments, as well as additional embodiments of the invention, will be apparent to persons skilled in the art upon reference to this description, without departing from the spirit of the invention, as recited in the claims appended hereto. For example, is should be obvious to one of ordinary skill in the art that the ratio of tips per grid section could be increased to greater than one to one. It is therefore contemplated that the appended claims will cover any such modifications or embodiments as fall within the true scope of the invention.

All of the U.S. Patents cited herein are hereby incorporated by reference as if set forth in their entirety.

What is claimed is:

1. A field emission display having a first plurality of pixels, a pixel of the first plurality comprising:

a. a second plurality of field emitter tips for displaying information in said pixel;

b. a pixelator for driving said second plurality;

c. a bus; and d. a display grid section for controlling display by a field emitter tip of the second plurality, said display grid section being coupled to said bus by a removable link.

2. A field emission display, according to claim 1, wherein said link comprises a fusible region, and removal comprises disintegration by a predetermined level of current through the link.

3. A field emission display, according to claim 1, wherein said link comprises a region sensitive to radiant energy, and removal comprises exposing the region to radiant energy.

4. In a field emitter display comprising a first plurality of pixels, a pixel of the first plurality comprising: a second plurality of field emitter tips for displaying information in said pixel; a pixelator for driving said second plurality; a bus; and a display grid section for controlling display by a field emitter tip of the second plurality, said display grid section being coupled to said bus by a removable link; a method for decoupling field emitter tips comprising the steps of:

testing a tip of said second plurality, said testing comprising generating a signal that identifies a tip of said second plurality to be decoupled; and decoupling said identified tip from said bus by removing said link in response to said signal.

5. A method, according to claim 4, wherein said testing further comprises the step of:

sensing infrared energy from a tip of said second plurality.

6. A method, according to claim 4, wherein said testing further comprises the step of:

sensing a current between a tip of said second plurality and said display grid section.

7. A method, according to claim 6, wherein said current is substantially within the range of 100 nA and 10 μA.

8. A method, according to claim 4, wherein said decoupling comprises the step of:

exposing said link to external energy substantially in the range of 0.1 μWatt and 10 mWatt.

9. A method, according to claim 8, wherein said external energy is generated by a laser.

10. A method, according to claim 4, wherein said decoupling comprises the step of:

exposing said link to an acid etch solution, said acid etch solution comprising at least one acid of the group consisting of $H_2SO_4$, $H_2SO_4$ diluted with $H_2O_2$, and $H_3PO_4$.

11. A field emitter display for information display by field emission in response to a first power signal and a second power signal, the field emitter display comprising:

a. a first bus for conveying the first power signal;

b. a second bus for conveying the second power signal;

c. a plurality of pixels, each pixel comprising:

(1) a pixelator for supplying current for field emission;

(2) a first tip and a second tip, each coupled to the pixelator;

(3) a first grid section coupled to the first bus so that field emission by the first tip is enabled responsive to the first power signal;

(4) a second grid section for enabling field emission from the second tip; and (5) first means for coupling the second grid section to the second bus so that field emission by the second tip is enabled responsive to the second power signal, and for permanently decoupling the second grid section from the second bus.

12. The field emitter display of claim 11 wherein the first emitter tip and the second emitter tip are located between the first bus and the second bus.

13. The field emitter display of claim 11 wherein the first means comprises a removable link.

* * * * *